US012743104B2

(12) United States Patent
Jensen et al.

(10) Patent No.: US 12,743,104 B2
(45) Date of Patent: Sep. 22, 2026

(54) METHOD FOR INTERACTIVELY PROVIDING WAYPOINTS TO A MOBILE ROBOT FOR USE IN THE MARKING OF A GEOMETRIC FIGURE ON A GROUND SURFACE

(71) Applicant: TinyMobileRobots ApS, Malling (DK)

(72) Inventors: Peter Jensen, Skanderborg (DK); Palle Flydtkjær, Herning (DK); Jens Peder Kvols Kristensen, Malling (DK); Kristian Korsgaard, Aarhus C (DK)

(73) Assignee: TinyMobileRobots ApS, Malling (DK)

( * ) Notice: Subject to any disclaimer, the term of this patent is extended or adjusted under 35 U.S.C. 154(b) by 103 days.

(21) Appl. No.: 18/273,609

(22) PCT Filed: Jan. 20, 2022

(86) PCT No.: PCT/EP2022/051212
§ 371 (c)(1),
(2) Date: Jul. 21, 2023

(87) PCT Pub. No.: WO2022/167228
PCT Pub. Date: Aug. 11, 2022

(65) Prior Publication Data

US 2024/0152161 A1 May 9, 2024

(30) Foreign Application Priority Data

Feb. 2, 2021 (DK) ............................. PA202100121

(51) Int. Cl.
*G05D 1/648* (2024.01)
*B05B 12/00* (2018.01)
(Continued)

(52) U.S. Cl.
CPC ........... *G05D 1/6484* (2024.01); *B05B 12/00* (2013.01); *B05B 13/005* (2013.01); *G05D 1/246* (2024.01); *G05D 2105/17* (2024.01)

(58) Field of Classification Search
None
See application file for complete search history.

(56) References Cited

U.S. PATENT DOCUMENTS

| | | | |
|---|---|---|---|
| 6,330,503 | B1 | 12/2001 | Sharp et al. |
| 2001/0033290 | A1 | 10/2001 | Scott et al. |

(Continued)

FOREIGN PATENT DOCUMENTS

| | | | |
|---|---|---|---|
| WO | 2004/100044 | A1 | 11/2004 |
| WO | 2017/063652 | A1 | 4/2017 |

(Continued)

OTHER PUBLICATIONS

Ardumower. GPS RTK ArduMower teil 1. Youtube [online] [video]. Feb. 14, 2020 [retrieved on Aug. 12, 2021]. Retrieved from <https://www.youtube.com/watch?v=fHSolQ5oQfA>.

(Continued)

*Primary Examiner* — Blake A Wood
(74) *Attorney, Agent, or Firm* — Morse, Barnes-Brown & Pendleton, P.C.; Sean D. Detweiler, Esq.

(57) ABSTRACT

Use of vector format graphics with robot marking, allowing the end user to design and use his own templates. By using vector graphics formats as a tool to let the user make his own templates, the user will have the flexibility of the CAD files in being able to draw any type of drawing, and at the same time having the flexibility of the templates by being able to move, scale and rotate the template freely.

14 Claims, 7 Drawing Sheets

(51) Int. Cl.

| | |
|---|---|
| ***B05B 13/00*** | (2006.01) |
| ***G05D 1/246*** | (2024.01) |
| ***G05D 105/00*** | (2024.01) |

(56) References Cited

U.S. PATENT DOCUMENTS

| | | | | |
|---|---|---|---|---|
| 2003/0168834 | A1 | 9/2003 | Ulrich | |
| 2007/0059098 | A1* | 3/2007 | Mayfield | A63C 19/06 404/84.5 |
| 2011/0039021 | A1* | 2/2011 | Persson | A63C 19/065 901/1 |
| 2017/0036351 | A1* | 2/2017 | Sorensen | B05B 12/00 |
| 2018/0307242 | A1* | 10/2018 | Sørensen | E01C 19/004 |
| 2019/0308323 | A1 | 10/2019 | Kristensen et al. | |
| 2019/0381529 | A1* | 12/2019 | Schaumberger | B05B 12/04 |
| 2021/0016310 | A1* | 1/2021 | Davis | B05B 1/083 |

FOREIGN PATENT DOCUMENTS

| | | | |
|---|---|---|---|
| WO | 2017/109066 | A1 | 6/2017 |
| WO | 2018/007365 | A1 | 1/2018 |

OTHER PUBLICATIONS

International Search Report from International Application PCT/EP2022/051212, dated: May 19, 2022.

* cited by examiner

METHOD FOR INTERACTIVELY PROVIDING WAYPOINTS TO A MOBILE ROBOT FOR USE IN THE MARKING OF A GEOMETRIC FIGURE ON A GROUND SURFACE

RELATED APPLICATIONS

This application is a national stage filing under 37 U.S.C. 371 of International Application No. PCT/EP2022/051212, filed Jan. 20, 2022, which claims priority to Denmark Patent Application No. PA202100121, filed Feb. 2, 2021. The entire teachings of said applications are incorporated herein by reference herein.

TECHNICAL FIELD OF THE INVENTION

The present invention relates to a method for interactively providing waypoints to a mobile robot for use in the marking of a geometric figure on a ground surface.

BACKGROUND OF THE INVENTION

For a robot to mark a well-defined figure on a surface, it will need a well-defined input, preferably in the form of waypoints. The most common method is to use standard templates that are handled by the user and located on a map or located using specific physical points in the real world. Alternatively, the robot is marking data based on CAD drawings. These CAD drawings may contain coordinates that match the intended location of the drawing in the real world or can be located using physical positions of the robot.

Templates are limited in function as they need to be predefined, typically, by the proprietor of the robot solution. The benefit of the templates is that they are easy to move to new locations as they are not bound to a specific location with specific coordinates and a specific coordinate system.

CAD is limited in function as it requires competences in CAD tools and knowledge about coordinate systems to be able to fit a CAD drawing to a coordinate system and match it to a real-world location. Furthermore, when a CAD drawing has been made and located, it is difficult to move to a new location. In most systems, the end user cannot develop and implement templates himself.

SUMMARY OF THE INVENTION

It is one object of the present invention to provide an alternative solution to the above methods that solves some of the above-mentioned problems.

The present invention combines the use of vector format graphics with robot marking, allowing the end user to design and use his own templates. By using vector graphics formats as a tool to let the user make his own templates, the user will have the flexibility of the CAD files in being able to draw any type of drawing, and at the same time having the flexibility of the templates by being able to move, scale and rotate the template freely.

A first aspect relates to the use of digital vector format graphics representing a geometric figure in the process of marking a surface with said geometric FIG. 10 with a mobile robot. Preferably, the digital vector format graphics are used in a first graphical data layer to overlay upon a second graphical data layer representing a georeferenced map, thereby obtaining a georeferenced geometric figure.

A second aspect relates to a method for interactively providing waypoints to a mobile robot for use in the marking of a geometric figure on a ground surface, said method comprising the steps of:

i) providing a geometric figure saved in a digital vector format;

ii) providing a mobile robot with a control unit comprising: a) database configured for storing data corresponding to a geometric figure and saved in a digital vector format, said database optionally comprising stored geometric figures saved in a digital vector format, b) a database configured for storing data corresponding to a georeferenced map, said database optionally comprising stored georeferenced maps, and c) a display unit;

wherein said control unit is configured to:

process a georeferenced map stored in said database and to send a display signal for displaying said stored georeferenced map to said display unit as a first layer;

process a geometric figure saved in a digital vector format stored in said database and to send a display signal for displaying said stored geometric figure to said display unit as a second layer;

wherein said display unit is configured to:

display said stored georeferenced map as a first layer in response to said display signals;

display said stored geometric figure to said display unit as a second layer as a in response to said display signals;

iii) optionally, storing a georeferenced map in said database;

iv) storing said geometric figure saved in a digital vector format in said database;

v) selecting a control function on said control unit accepting manual selection of a georeferenced map in said database to be displayed on said display unit; said georeferenced map either being the one stored in step iii) or an already stored georeferenced map;

vi.a) selecting a control function on said control unit accepting manual selection of a geometric figure in said database to be displayed on said display unit; said geometric figure either being the one stored in step iv) or an already stored geometric figure;

wherein said display unit is configured to overlay said selection in a first and a second layer on said display unit, respectively;

vii) selecting a control function on said control unit instructing said control unit to compute waypoint coordinates of said geometric figure, said control unit configured to compute said waypoints based on the position of said second layer, i.e., said geometric figure, relative to said first layer, i.e., said georeferenced map; and viii.a) instructing said mobile robot via said control unit to store said computed waypoint coordinates of said geometric figure in a database; or viii.b) instructing said mobile robot via said control unit to mark said geometric figure onto said surface.

A third aspect relates to a mobile robot for use in the marking of a geometric figure on a ground surface comprising:

a paint spraying means; and a control unit comprising:

a) database configured for storing data corresponding to a geometric figure and saved in a digital vector format, said database optionally comprising stored geometric figures saved in a digital vector format;

b) a database configured for storing data corresponding to a georeferenced map, said database optionally comprising stored georeferenced maps; and c) a display unit;

wherein said control unit is configured for being in communication with said mobile robot;

wherein said control unit is configured to:

process a georeferenced map stored in said database and to send a display signal for displaying said stored georeferenced map to said display unit as a first layer;

process a geometric figure saved in a digital vector format stored in said database and to send a display signal for displaying said stored geometric FIG. to said display unit as a second layer;

wherein said display unit is configured to:

display said stored georeferenced map as a first layer in response to said display signals;

display said stored geometric figure to said display unit as a second layer as a in response to said display signals;

wherein said control unit further comprises:

d) a first processor; and e) a first memory coupled to said first processor, wherein said first memory comprises program instructions configured for:

selecting a control function on said control unit accepting manual selection of a georeferenced map in said database to be displayed on said display unit;

selecting a control function on said control unit accepting manual selection of a geometric figure in said database to be displayed on said display unit;

wherein said display unit is configured to overlay said selection in a first and a second layer on said display unit, respectively;

selecting a control function on said control unit instructing said control unit to compute waypoint coordinates of said geometric figure, said control unit configured, via a processor, to compute said waypoints based on the position of said second layer, i.e., said geometric figure, relative to said first layer, i.e., said georeferenced map, and optionally storing said computed waypoint coordinates of said geometric figure in a database; and selecting a control function on said control unit instructing said mobile robot to store said computed waypoint coordinates of said geometric figure in a database; or selecting a control function on said control unit instructing said mobile robot to mark said geometric figure onto said surface.

Vector graphics are computer graphics images that are defined in terms of points on a Cartesian plane, which are connected by lines and curves to form polygons and other shapes. Vector graphics have the unique advantage over raster graphics in that the points, lines, and curves may be scaled up or down to any resolution with no aliasing. The points determine the direction of the vector path; and each path may have various properties including values for stroke color, shape, curve, thickness, and fill.

Vector graphics are commonly found today in the SVG, EPS, PDF or AI types of graphic digital file formats, and are intrinsically different from the more common raster graphics file formats, such as JPEG, PNG, APNG, GIF, and MPEG4. The most used vector graphic formats are SVG, PDF, AI, EPS, but other formats exist, though seldom used. The present invention contemplates the use of any one of such digital vector formats.

Because digital vector graphics consist of coordinates with lines or curves between them, the size of representation does not depend on the dimensions of the object. This minimal amount of information translates to a much smaller file size compared to large raster images, which are defined pixel by pixel. Correspondingly, one can infinitely zoom in on e.g., a circle arc, and it remains smooth. When zooming in, lines and curves need not get wider proportionally.

Often the width is either not increased or less than proportional. On the other hand, irregular curves represented by simple geometric shapes may be made proportionally wider when zooming in, to keep them looking smooth and not like these geometric shapes.

The parameters of objects are stored and can later be modified. This means that moving, scaling, rotating, filling etc. does not degrade the quality of a drawing. Moreover, it is usual to specify the dimensions in device-independent units, which results in the best possible rasterization on raster devices.

In one or more embodiments, the control unit is configured to allow a user to move said second layer relative to said first layer, wherein said method further comprises:

vi.b) selecting a control function on said control unit accepting manual movement of said second layer relative to said first layer;

vi.c) positioning said second layer relative to said first layer in order to position said geometric figure at a specific geographical location on said georeferenced map. Preferably, said control unit is configured to allow a user to adjust the size of said geometric figure relative to said relative to said first layer, i.e., relative to said georeferenced map, wherein said method further comprises:

vi.d) selecting a control function on said control unit accepting resizing of said geometric figure;

vi.e) adjusting the size of said geometric figure relative to said first layer in order to secure the correct size of said geometric figure to be marked onto said surface. Preferably, and more preferably in combination with size adjustment, said control unit is configured to allow a user to rotate said geometric figure relative to said first layer, i.e., relative to said georeferenced map, wherein said method further comprises:

vi.f) selecting a control function on said control unit accepting rotation of said geometric figure;

vi.g) adjusting the angle of rotation of said geometric figure relative to said first layer in order to secure the correct position of said geometric figure to be marked onto said surface.

In one or more embodiments, the control unit is configured to allow a user to move said first layer relative to said second layer, wherein said method further comprises:

vi.b) selecting a control function on said control unit accepting manual movement of said first layer relative to said second layer;

vi.c) positioning said first layer relative to said second layer in order to position said georeferenced map or one or more way points relative to said geometric figure.

In one or more embodiments, the control unit is configured to allow a user to adjust the size of said geometric figure relative to said relative to said first layer, i.e., relative to said georeferenced map, wherein said method further comprises:

vi.d) selecting a control function on said control unit accepting resizing of said geometric figure;

vi.e) adjusting the size of said geometric figure relative to said first layer in order to secure the correct size of said geometric figure to be marked onto said surface.

In one or more embodiments, the control unit is configured to allow a user to rotate said geometric figure relative to said first layer, i.e., relative to said georeferenced map, wherein said method further comprises:

vi.d) selecting a control function on said control unit accepting rotation of said geometric figure;

vi.e) adjusting the angle of rotation of said geometric figure relative to said first layer in order to secure the correct position of said geometric figure to be marked onto said surface.

In one or more embodiments, the control unit is configured to allow a user to move said first layer relative to said second layer, wherein said method further comprises:

vi.b) selecting a control function on said control unit accepting manual movement of said first layer relative to said second layer;

vi.c) positioning said first layer relative to said second layer in order to position said georeferenced map or one or more way points relative to said geometric figure.

In one or more embodiments, the method further comprises:

selecting a control function on said control unit accepting collection of points for a geofence with said mobile robot, said points to be displayed as a geofence on said display unit, preferably in a separate layer; and adjusting the position of said geometric figure to fit within said geofence by movement of said geometric figure relative to said second layer, and/or by resizing said geometric figure and/or by rotating said geometric figure.

In one or more embodiments, said first memory of said control unit comprises program instructions configured for:

a) selecting a control function on said control unit accepting manual movement of said second layer relative to said first layer; and/or b) selecting a control function on said control unit accepting resizing of said geometric figure; and/or c) selecting a control function on said control unit accepting rotation of said geometric figure; and/or d) selecting a control function on said control unit accepting manual movement of said first layer relative to said second layer; and/or e) selecting a control function on said control unit accepting collection of points for a geofence with said mobile robot, said points to be displayed as a geofence on said display unit.

Any selection of a)-e) is possible, and some of the program instructions may therefore be omitted in some embodiments.

The image/geometric figure may be positioned by hand gesture on the control unit, e.g., a tablet, which introduces errors. If the user wants specific points on the image/geometric figure matched with specific points in the real world, the points must be paired, i.e., associated. In the process of loading in the vector image, the user can pair, i.e., associate, the robot position to those points.

In one or more embodiments, the control unit is configured to allow a user to pair, i.e., associate, a specific point on said geometric figure with a specific point with the current location of said mobile robot or control unit, wherein said method further comprises:

positioning said mobile robot at a wanted position;

selecting a specific point on said geometric figure; or vice versa; and selecting a control function on said control unit accepting pairing, i.e., association, of said point on said geometric figure with said current location of said mobile robot or control unit.

In one or more embodiments, said first memory of said mobile robot comprises program instructions configured for:

selecting a control function on said control unit accepting pairing, i.e., association, of said point on said geometric figure with said current location of said mobile robot.

As an example, if the user loads an image/geometric figure of a rectangle with four corners, the user will select corner "1" and then drive the mobile robot to the position in the real world, where corner "1" should be positioned. The user then clicks "pair" (selects a control function on said control unit instructing said control unit to pair, i.e., to associate, said selected points), which tells the system to use the current robot position as corner 1. After doing so for all four corners of the square, the image/geometric figure is saved in the system, and the defining points are now the ones that the mobile robot has collected. The image/geometric figure is then projected onto the view, and thus the image/geometric figure can be seen on the georeferenced map/photo, but in a different layer.

DETAILED DESCRIPTION OF THE INVENTION

Figure 1:
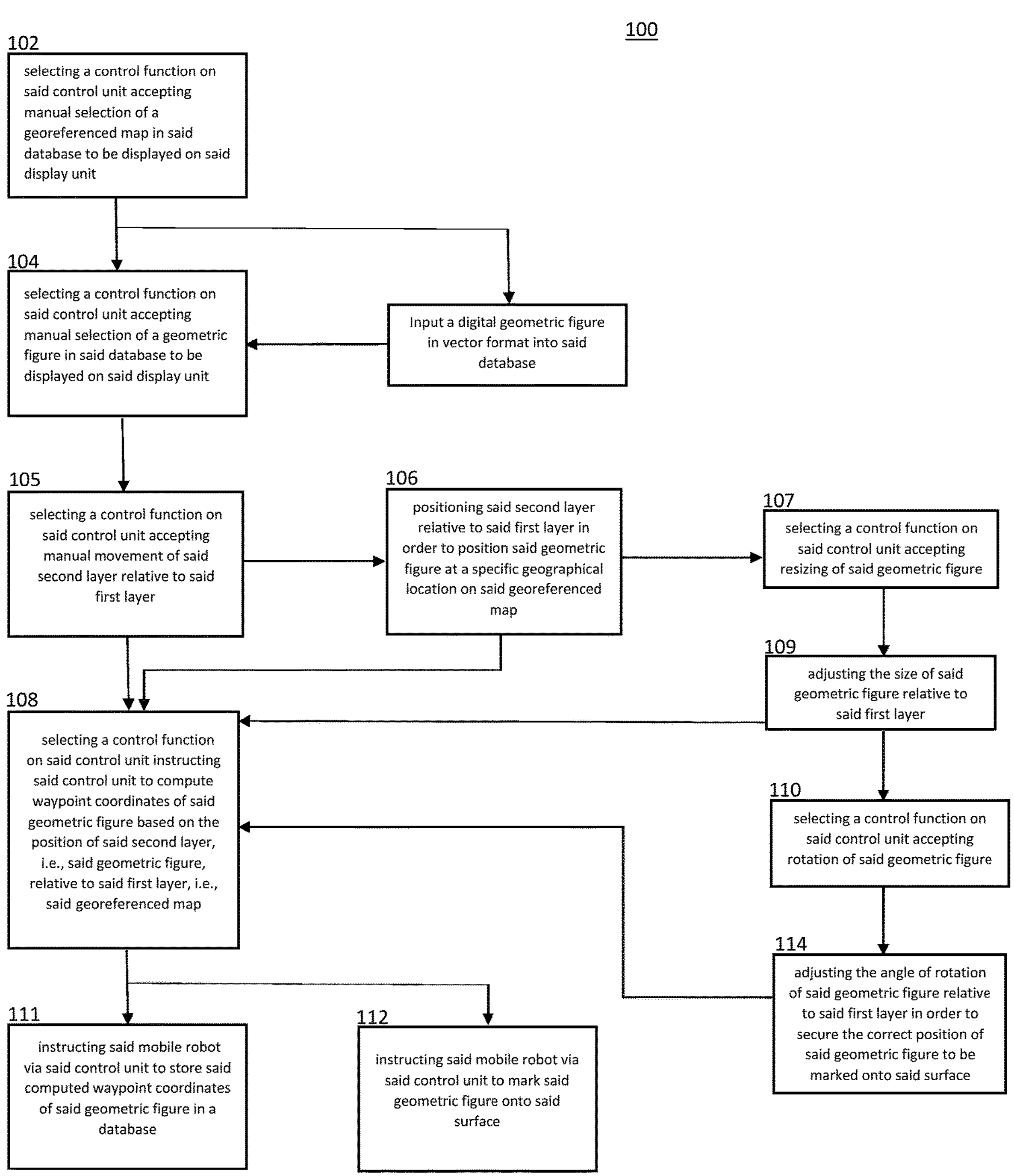
FIG. 1 is a flow chart depicting a methodology in accordance with various embodiments of the invention.

A preferred embodiment of the invention, as shown in FIG. 1, involves a method 100 for interactively providing waypoints to a mobile robot for use in the marking of a geometric figure on a ground surface. The mobile robot is operated with a control unit. The control unit comprises a database configured for storing data corresponding to a geometric figure and saved in a digital vector format. The database may preferably comprise stored geometric figures saved in a digital vector format. The control unit also comprises a database configured for storing data corresponding to a georeferenced map. The database may preferably comprise stored georeferenced maps/photos. The control unit further comprises a display unit. The control unit is configured to process a georeferenced map/photo stored in said database and to send a display signal for displaying said stored georeferenced map/photo to said display unit as a first layer. The control unit is configured to process a geometric figure saved in a digital vector format stored in said database and to send a display signal for displaying said stored geometric figure to said display unit as a second layer. The display unit then a) displays said stored georeferenced map as a first layer in response to said display signals, and b) displays said stored geometric figure to said display unit as a second layer as a in response to said display signals. If not already stored in said databases, the method 100 may comprise the pre-steps of storing a georeferenced map/photo and geometric figure saved in a digital vector format in said database(s).

The main steps of the method 100 is:

selecting a control function on said control unit accepting manual selection of a georeferenced map in said database to be displayed on said display unit (Step 102);

selecting a control function on said control unit accepting manual selection of a geometric figure in said database to be displayed on said display unit (Step 104), whereby said display unit overlays said first and a second layer on said display unit;

selecting a control function on said control unit instructing said control unit to compute waypoint coordinates of said geometric figure based on the position of said second layer, i.e., said geometric figure, relative to said first layer, i.e., said georeferenced map (Step 108); and either instructing said mobile robot via said control unit to store said computed waypoint coordinates of said geometric figure in a database (Step 111); or instructing said mobile robot via said control unit to mark said geometric figure onto said surface (Step 112).

The mobile robot may be adapted to move along a series of waypoints, either in a given order, or randomly. The waypoints each comprises two- or three-dimensional position information and, optionally, two- or three-dimensional orientation information. The mobile robot may be wheeled or tracked.

In principle, the method utilizes a system comprising two devices—the mobile robot, and the control unit, e.g., a tablet computer. The robot and the control unit may handle coordinates in different coordinate reference systems (CRS) but may also use the same CRS. If different CSR's are used, the points in the CRS of the control unit are projected to the CRS of the mobile robot, e.g., using the software PROJ (proj.org). Projections are typically performed between two coordinate reference systems, e.g., from CRS "A" and to CRS "B. The user of the system may manually or automatically select a wanted CRS, usually in the Universal Transverse Mercator (UTM) standard, e.g., based on the robot's location on the earth, e.g., the UTM zone 32 (UTM32). By system standard, this is the B projection. The control unit, via the display unit, shows a map comprising three parts: the view (i.e., what the user sees on the display unit), a background image layer (i.e., the first layer), and a drawing layer (i.e., the second layer). The view has a CRS, which is usually the World Geodetic System 1984 (WGS84). By system standard, this view projection is the A projection.

The background image is typically an orthorectified aerial imagery downloaded from a map service, e.g., Bing maps (bingmapsportal.com), in tiles of small square images. The map service provider matches the images to the real world in a specified CRS, e.g., EPSG:2056. Using OpenLayers, the background image is projected onto the view, such that it is positioned correctly in the WGS84 projection, even though the map is defined in EPSG:2056.

The user can then load a vector image file, e.g., an SVG file, of a geometric figure onto the map using the control unit. Vector images are defined by basic geometries, such as points, lines, circles, arcs, splines etc., with as few defining parameters as possible. The geometries are positioned in the vector image by defining points, or coordinates, e.g., the center of a circle. When the image is loaded, these points are offset, such that the entire image is shown on the visible part of the map, i.e., the view, but drawn onto the drawing layer (i.e., the second layer), which is using the user projection B, and saved locally on the control unit. Hence, the drawing layer, with its drawing/geometric figure, is thereby projected onto the view. Thus, the first (i.e., the image layer) and second (i.e., the drawing layer) layers may and often will extend beyond the view.

It should be noted that the term "geometric figure" in the context of this application is to be interpreted as meaning a figure of almost any desired shape, such as triangular shapes, straight or curved stripes, straight or curved lines, straight or curved arrows, parabolic shapes, or sports field line marks. Hence, any shape, which may be depicted by line segments, and which may appear in a repeating pattern are included. The term "image" may be used interchangeably with the term "geometric figure".

The vector image, i.e., the geometric figure, is now positioned in the real world by relating this image, which is defined in projection B, to the background map, i.e., the georeferenced map/photo, which has its own projection. The mobile robot can now draw the image in the real world.

As background images, i.e., the georeferenced maps/photos, are inherently unprecise to a certain degree, it is difficult, in some cases, to place an image/geometric figure with the wanted centimeter-precision that the user expects. To alleviate this problem, the user can create a reference geometry with the mobile robot to make sure that the drawing is positioned as expected in the real world. To do this, the user could e.g., measure four points to create a rectangle, that would act as a "safe zone/geofence" in which the vector image can be placed (the system supports drawing all basic geometries). When a point is measured with the robot, it is instantly shown on the map, preferably in the view, e.g., in a third layer, as the point gets projected from B to A automatically. In order to perform such an operation, the mobile robot may preferably comprise a positioning system configured for receiving a GNSS signal. Global Navigation Satellite Systems (GNSS) is a collective term for a variety of satellite navigation systems, which use orbiting satellites as navigation reference points to determine position fixes on the ground. GNSS includes the Global Positioning System (GPS), the Global Navigation Satellite System (GLONASS), the Compass system, Galileo, and a number of Satellite based augmentation systems (SBAS). In typical civilian applications, a single GNSS receiver can measure a ground position with a precision of about ten meters. This is, in part, due to various error contributions, which often reduce the precision of determining a position fix. For example, as the GNSS signals pass through the ionosphere and troposphere, propagation delays may occur. Other factors, which may reduce the precision of determining a position fix, may include satellite clock errors, GNSS receiver clock errors, and satellite position errors. One method for improving the precision for determining a position fix is Real-Time Kinematic (RTK) GNSS. Real Time Kinematic (RTK) satellite navigation is a technique using the phase of the signal's carrier wave, rather than the information content of the signal, and relies on a single reference station or interpolated virtual station to provide real-time corrections.

Hence, the mobile robot may comprise a retroreflector, and a positioning system receiver unit configured for receiving a positioning (e.g., GNSS) signal that receives the position signal from a total station. The mobile robot may comprise a Real Time Kinematic (RTK) GNSS positioning system. Preferably, the retroreflector and/or the RTK GNSS positioning system are positioned on an elongate member extending upward from a base of the mobile robot. This is an advantage to make the retroreflector more visible for the emitter/receiver unit in the total station. Furthermore, the RTK GNSS positioning system will be more visible for the satellites. The elongate member may be height adjustable, e.g., comprising telescoping elongate members. Preferably, the RTK positioning system is positioned above the retroreflector. This is to avoid shielding by the retroreflector. The measuring element may be a sonic-based measuring device or a laser-based measuring device.

The point may, however, not correlate exactly with the background image, as the image may contain small projection errors. Regardless of these projection errors, the shown point unequivocally relates to the exact point in the real world, which was just measured by the mobile robot. By measuring such a safe zone/geofence, the image/geometric figure can be placed by hand on the map with centimeter precision.

The image/geometric figure is still positioned by hand gesture on the control unit, e.g., a tablet, which introduces errors. If the user wants specific points on the image/geometric figure matched with specific points in the real world, the points must be paired, i.e., associated. In the process of loading in the vector image, the user can pair, i.e., associate, the robot position to those points. As an example, if the user loads an image/geometric figure of a rectangle with four corners, the user will select corner "1" and then drive the mobile robot to the position in the real world, where corner "1" should be positioned. The user then clicks "pair" (selects a control function on said control unit instructing said control unit to pair, i.e., to associate, said selected points), which tells the system to use the current robot position as corner 1. After doing so for all four corners of the square, the image/geometric figure is saved in the system, and the defining points are now the ones that the mobile robot has collected. The image/geometric figure is then projected onto the view, and thus the image/geometric figure can be seen on the georeferenced map/photo, but in a different layer.

In either case, the georeferenced map/photo exists in the known projection B, and can then be sent to the mobile robot, which in turn can draw the exact image in the real world.

The act of storing data is well-known within the art. As an example, the control unit may comprise a computing system including a processor, a memory, a communication unit, an output device, an input device, and a data store, which may be communicatively coupled by a communication bus. The mentioned computing system should be understood as an example and that it may take other forms and include additional or fewer components without departing from the scope of the present disclosure. For instance, various components of the computing device may be coupled for communication using a variety of communication protocols and/or technologies including, for instance, communication buses, software communication mechanisms, computer networks, etc. The computing system may include various operating systems, sensors, additional processors, and other physical configurations. The processor, memory, communication unit, etc., are representative of one or more of these components. The processor may execute software instructions by performing various input, logical, and/or mathematical operations. The processor may have various computing architectures to method data signals (e.g., CISC, RISC, etc.). The processor may be physical and/or virtual and may include a single core or plurality of processing units and/or cores. The processor may be coupled to the memory via the bus to access data and instructions therefrom and store data therein. The bus may couple the processor to the other components of the computing system including, for example, the memory, the communication unit, the input device, the output device, and the data store. The memory may store and provide data access to the other components of the computing system. The memory may be included in a single computing device or a plurality of computing devices. The memory may store instructions and/or data that may be executed by the processor. For example, the memory may store instructions and data, including, for example, an operating system, hardware drivers, other software applications, databases, etc., which may implement the techniques described herein. The memory may be coupled to the bus for communication with the processor and the other components of computing system. The memory may include a non-transitory computer-usable (e.g., readable, writeable, etc.) medium, which can be any non-transitory apparatus or device that can contain, store, communicate, propagate, or transport instructions, data, computer programs, software, code, routines, etc., for processing by or in connection with the processor. In some implementations, the memory may include one or more of volatile memory and non-volatile memory (e.g., RAM, ROM, hard disk, optical disk, etc.). It should be understood that the memory may be a single device or may include multiple types of devices and configurations. The input device may include any device for inputting information into the computing system. In some implementations, the input device may include one or more peripheral devices. For example, the input device may include the display unit comprising a touchscreen integrated with the output device, etc. The output device may be any device capable of outputting information from the computing system. The display unit includes a display (LCD, OLED, etc.), preferably touch-screen, and optionally one or more of a printer, a haptic device, audio reproduction device, display, a remote computing device, etc. The output device may be the display unit, which display electronic images and data output by a processor of the computing system for presentation to a user, such as the processor or another dedicated processor. The data store may include information sources for storing and providing access to data. In some implementations, the data store may store data associated with a database management system (DBMS) operable on the computing system. For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations. The data stored by the data store may be organized and queried using various criteria including any type of data stored by them. The data store may include data tables, databases, or other organized collections of data. The data store may be included in the computing system or in another computing system and/or storage system distinct from but coupled to or accessible by the computing system. The data stores can include one or more non-transitory computer-readable mediums for storing the data. In some implementations, the data stores may be incorporated with the memory or may be distinct therefrom. The components may be communicatively coupled by the bus and/or the processor to one another and/or the other components of the computing system. In some implementations, the components may include computer logic (e.g., software logic, hardware logic, etc.) executable by the processor to provide their acts and/or functionality. These components may be adapted for cooperation and communication with the processor and the other components of the computing system.

The control unit may be configured to allow a user to move said second layer relative to said first layer. The method 100 is also illustrated with optional steps of:

- selecting a control function on said control unit accepting manual movement of said second layer relative to said first layer (Step 105); and positioning said second layer relative to said first layer in order to position said geometric figure at a specific geographical location on said georeferenced map (Step 106).

The control unit may be configured to allow a user to adjust the size of said geometric figure relative to said relative to said first layer, i.e., relative to said georeferenced map. The method 100 is also illustrated with optional steps of:

- selecting a control function on said control unit accepting resizing of said geometric figure (Step 107); and
- adjusting the size of said geometric figure relative to said first layer in order to secure the correct size of said geometric figure to be marked onto said surface (Step 109).

The control unit may be configured to allow a user to rotate said geometric figure relative to said first layer, i.e., relative to said georeferenced map. The method 100 is also illustrated with optional steps of:

- selecting a control function on said control unit accepting rotation of said geometric figure (Step 110);
- adjusting the angle of rotation of said geometric figure relative to said first layer in order to secure the correct position of said geometric figure to be marked onto said surface (Step 114).

The pairs of steps may obviously be performed in any order possible, such that e.g., the zoom function is performed first, and the resizing function is performed later, or the resizing function is performed prior to the manual movement of the layers relative to one another. Some of the steps may obviously be omitted if not needed. This is entirely up to the user.

Figure 2:
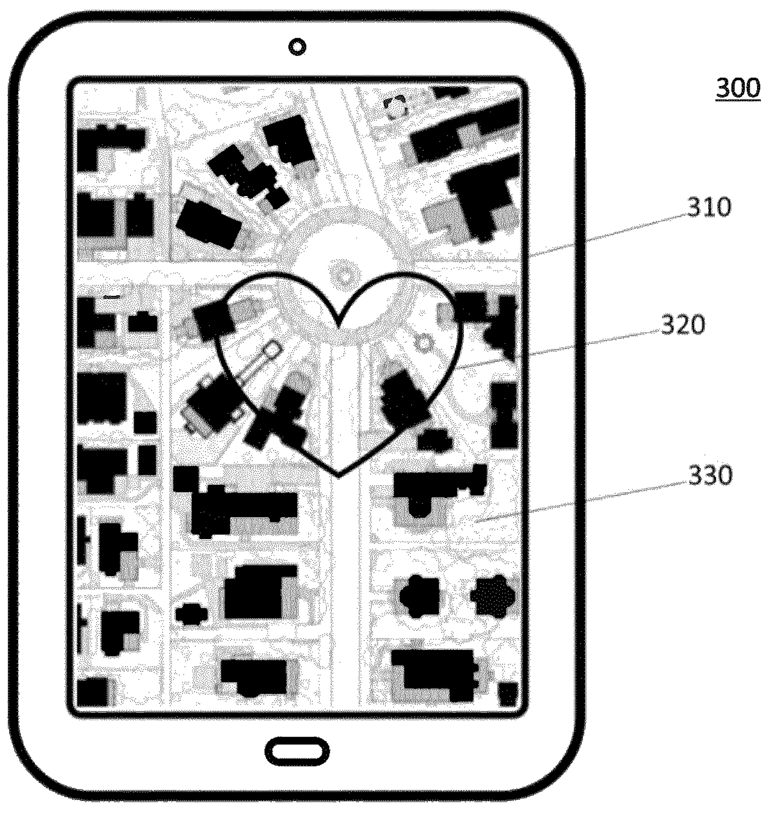
FIGS. 2-6 depict snapshots of a user view on a control unit during the operation of a methodology in accordance with various embodiments of the invention.

FIG. 2 illustrates the situation, where a user has performed the method steps of:

- selecting a control function on said control unit accepting manual selection of a georeferenced map in said database to be displayed on said display unit (Step 102);
- selecting a control function on said control unit accepting manual selection of a geometric figure in said database to be displayed on said display unit (Step 104), whereby said display unit overlays said first and a second layer on said display unit. The user can see the view 310, and is now ready to manipulate the geometric figure, the heart 320, relative to the georeferenced map 330 to its intended position.

Figure 3:
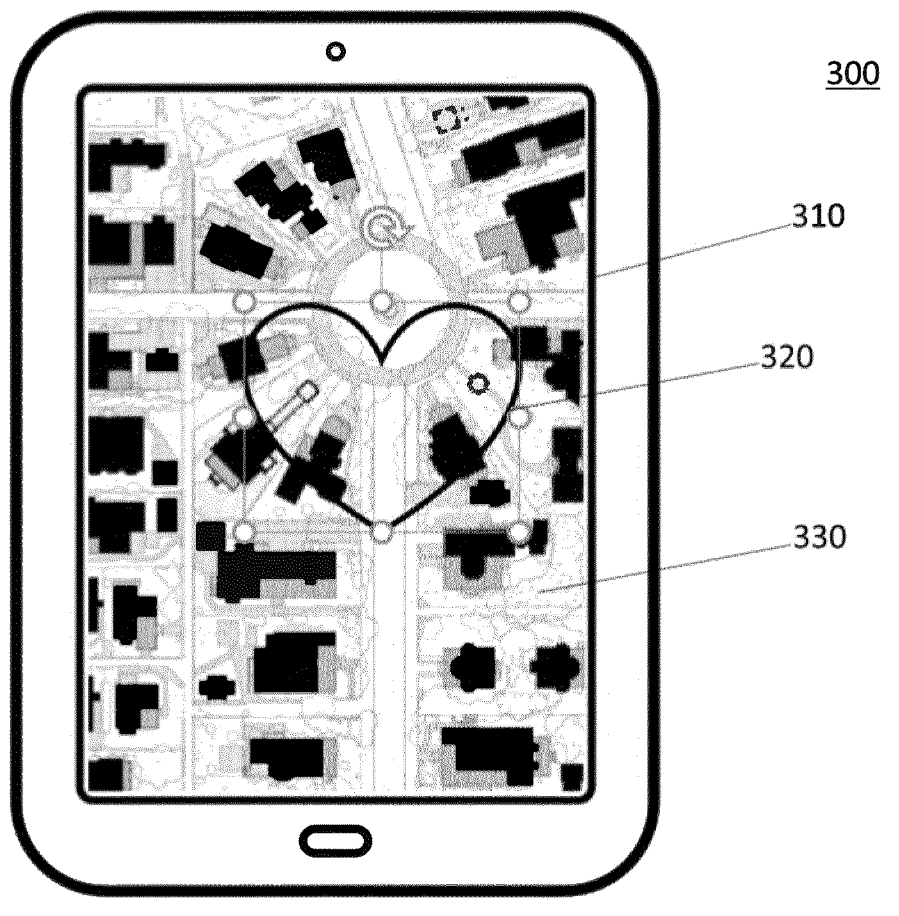

FIG. 3 illustrates the situation, where the control unit 300 is configured to allow a user to move the second layer relative to the first layer, and where a user has performed the method step of:

- selecting a control function on said control unit accepting manual movement of said second layer relative to said first layer (Step 105).

Figure 4:
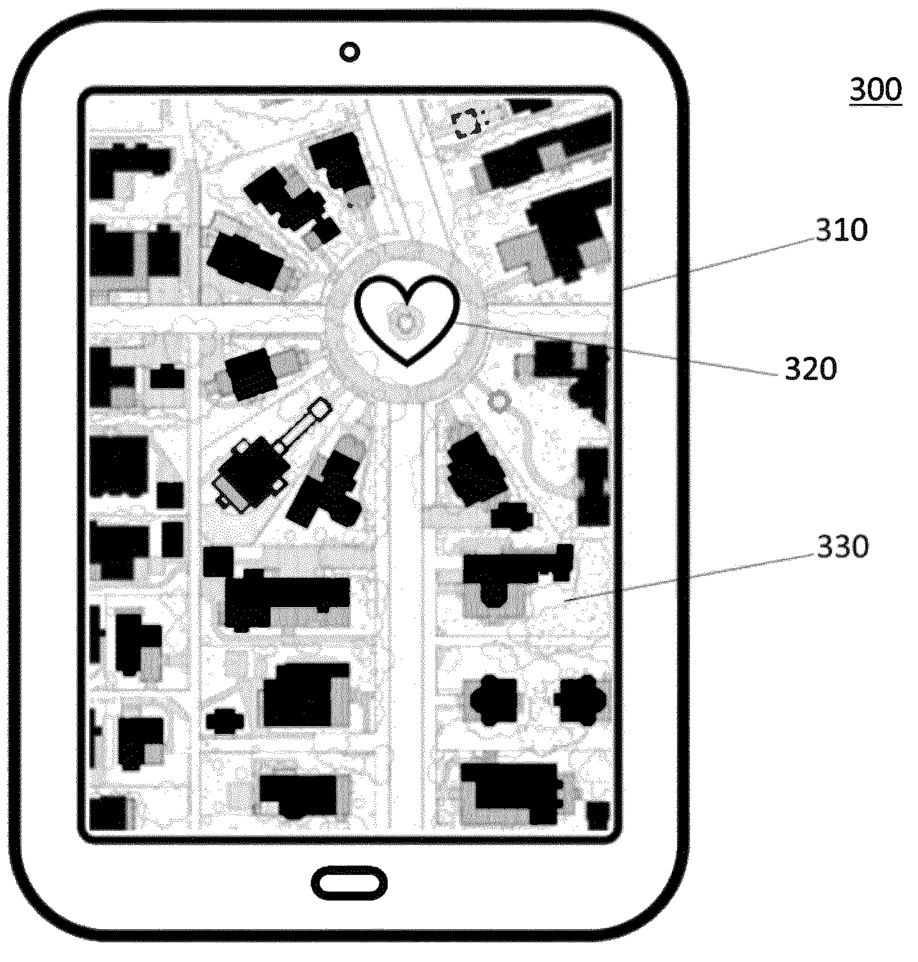

FIG. 4 illustrates the situation, where a user has performed the method steps of:

- positioning said second layer relative to said first layer in order to position said geometric figure at a specific geographical location on said georeferenced map; and where the control unit 300 is configured to allow a user to adjust the size of the geometric FIG. 320, the heart, relative to the georeferenced map 310 (Step 106);
- selecting a control function on said control unit 300 accepting resizing of said geometric FIG. 320 (Step 107); and
- adjusting the size of said geometric FIG. 320 relative to said first layer in order to secure the correct size of said geometric FIG. 320 to be marked onto the surface in the real world (Step 109).

Figure 5:
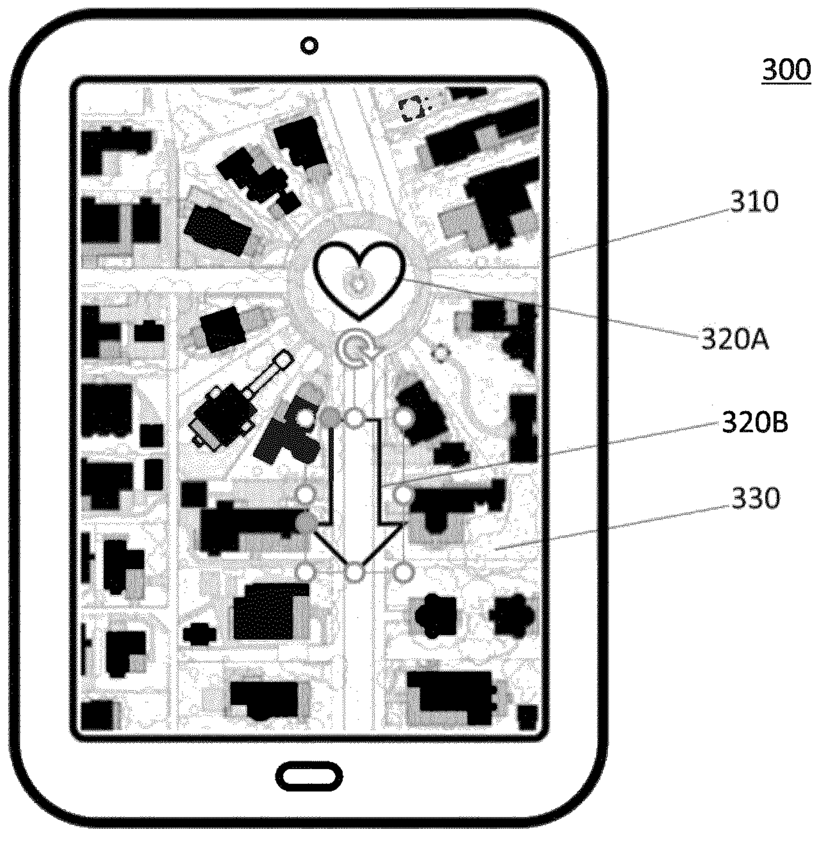
Figure 6:
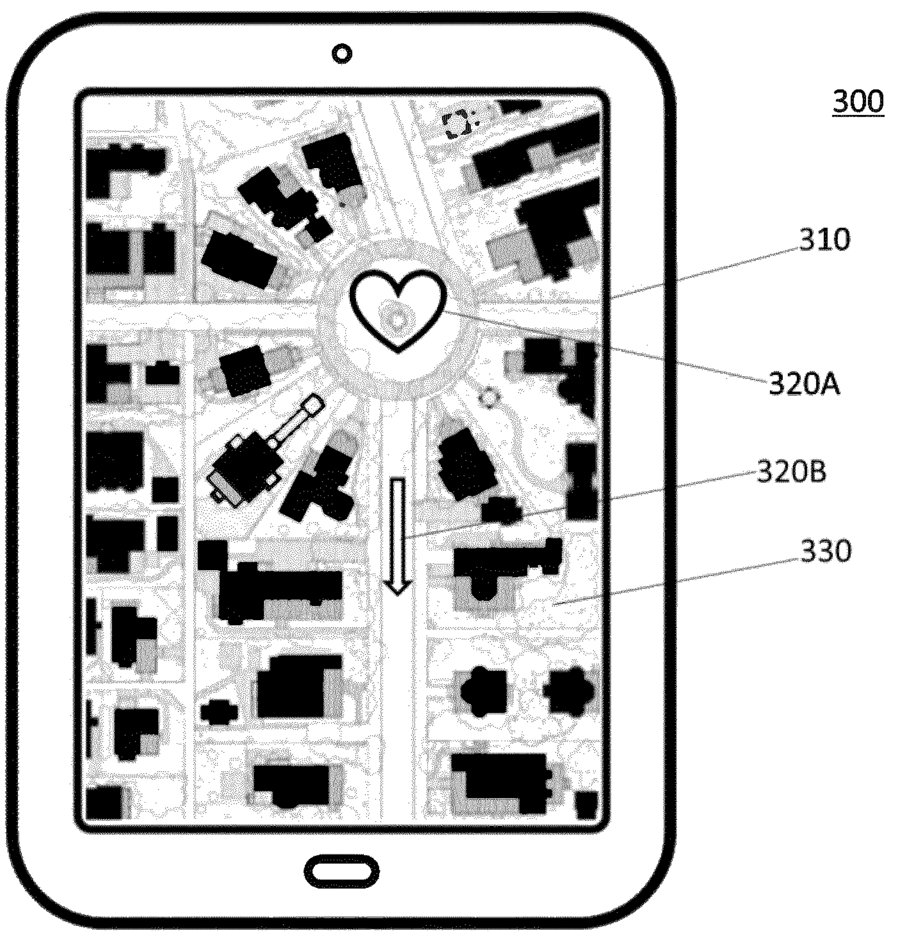

FIGS. 5 and 6 illustrates the same steps performed subsequently with a second geometric FIG. 320, an arrow 320B, possible positioned in a different layer than the heart 320A.

Figure 7:
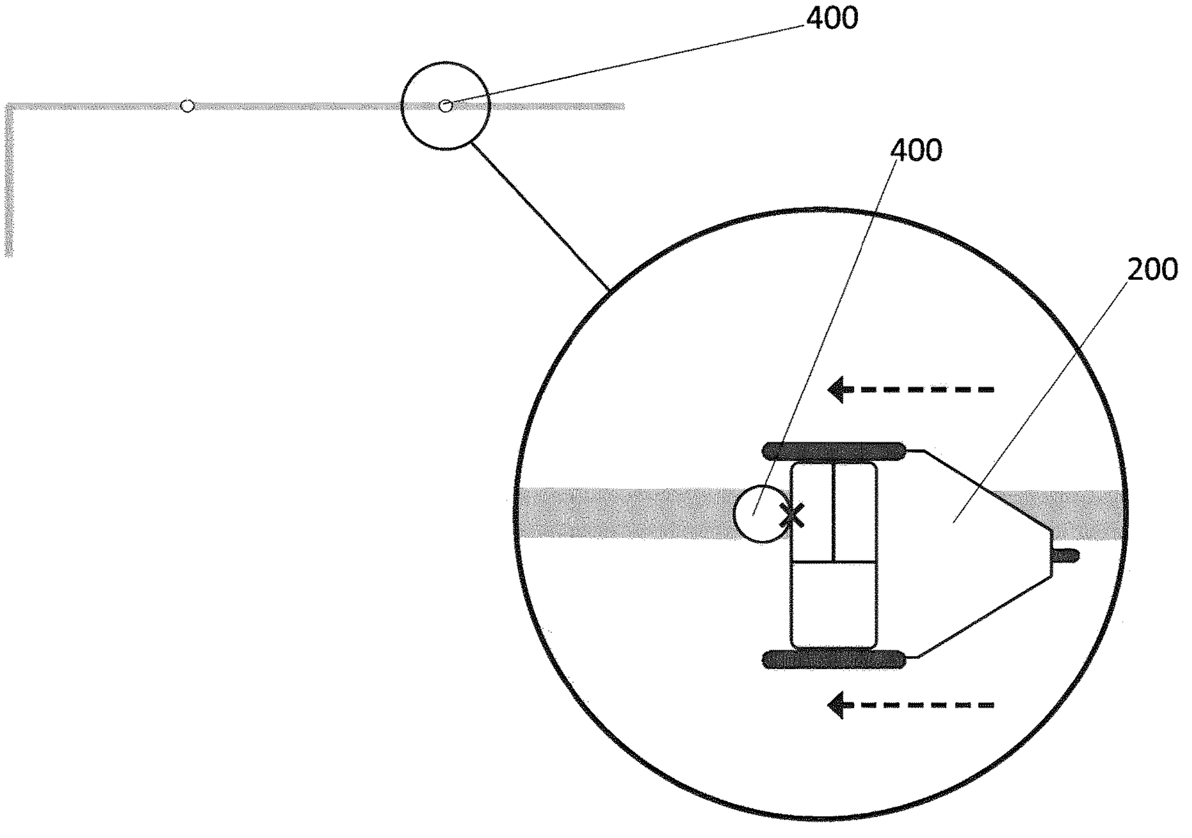
FIG. 7 depicts the process of collecting points for a geofence with the mobile robot.

FIG. 7 shows the process of collecting points for a geofence with the mobile robot 200. Here, an obstacle 400 in the form of a goal post is avoided by collecting a point just beside it. Collecting a point with a mobile robot guided with the control unit is generally known within the art. The points are collected by placing the mobile robot on the target location that is to be collected. The mobile robot can be placed by driving it manually, via the control unit/input device, to the location or by moving it by hand or both. The method may include positioning the mobile robot in proximity to a first target/obstacle and directing a position determining device of the mobile device to said first target/obstacle. When the mobile robot is at the right location, a pointing device (shown as an X at the rear end of the mobile robot) is needed to ensure that the mobile robot is pointing at the precise location. Most mobile robots on the market cannot be more precise than the user's ability to point out the location of any point below or near the mobile robot. Hence, the position determining device according to the present invention preferably comprises a pointing device adapted for pointing to a target location to be collected; and is mounted on the mobile robot (here shown positioned at the rear end), such that e.g., a tip of the pointing device or a light emitted by the pointing device is visible for the user of the mobile robot when the user is in an upright position. The mobile robot is configured such that the distance between the phase center of the positioning system receiver unit and the pointing element is known. Thereby, the mobile robot can determine the exact position of the target position that the pointing element/device is directed towards.

This pointing element/device can be mechanical, or light based. A possible solution is a laser pointer. Furthermore, it is important that the user of the mobile robot can see the tip of the pointing device or the light emitted by the pointing device. Otherwise, he/she cannot be sure that the right location is collected. If the pointing device is positioned below the mobile robot, a hole or window should be present in the mobile robot chassis for the user to be able to see the tip or the pointing device or the light emitted by the pointing device. Alternatively, the pointing device is positioned on the rear end of the mobile robot, on the front end of the mobile robot, or on the side of the mobile robot. Alternatively, the pointing device is light emitting, such as a laser pointer. Again alternatively, the pointing device is a part of a paint spraying means. In some embodiments, the position determining device comprises a measuring element adapted for measuring the distance between the location to be measured and the mobile robot; and a processor coupled to receive a) the positioning information signal from the positioning system receiver unit, and b) the distance between the location to be measured and the mobile robot. The said processor is configured for computing the position of the location to be measured. How such a calculation may be performed is well-known to the killed person and will not receive further attention. The mobile robot may receive information about its positioning in many ways, and such methods are well-known within the art. In a preferred embodiment, the position determining device comprises:

- a positioning system receiver unit configured for receiving a positioning (e.g. GNSS) signal;
- a pointing element for pointing to a location to be measured;

- a measuring element for measuring the distance vector between the location to be measured and the mobile robot; and
- a processor coupled to receive a) the positioning information signal from the positioning system receiver unit, and b) the distance vector between the location to be measured and the mobile robot, wherein said processor is configured for computing the position of the location to be measured.

In another preferred embodiment, the position determining device comprises:

- a positioning system receiver unit configured for receiving a position (e.g. GNSS) signal;
- a pointing element for pointing to a location to be measured;
- a measuring element for measuring the distance vector between the location to be measured and the mobile robot;
- a level element that determines the tilt of the mobile robot; and
- a processor coupled to receive a) the positioning information signal from the positioning system receiver unit, b) the distance vector between the location to be measured and the mobile robot, and c) the tilt of the mobile robot, wherein said processor is configured for computing the position of the location to be measured.

In a particularly preferred embodiment, the position determining device comprises a positioning system positioned on the mobile robot and disposed offset at a known distance relative to pointing device. The mobile robot further comprises a gyro sensor configured for determining the rotation angular velocity of the mobile robot, and the position determining device is configured to determine the point to which the pointing device is pointing from information relating to the historical path of the mobile robot and the actual information from the gyro sensor. Such calculations are well-known to the skilled person and will not receive more attention.

The mobile robot is then configured to provide display signals for displaying stored points and optionally the current position of the mobile robot relative thereto. The display unit of the control unit is configured to display said stored waypoints, possible in a separate layer, in response to said display signals. This configuration aids to the process of collecting points, as the user can see the position of the mobile robot and the position of previously collected points. When driving the mobile robot to a new target location, the distance to the previous point can optionally be seen, thereby allowing the user to choose a point on the ground or reject a point on the ground based on the information on the display unit. A reason for rejecting a point on the ground may be that the distance does not match with the intended size of the geofence. Optionally, the mobile robot is configured to calculate a distance between stored points and provide display signals for displaying a distance between stored points. The display unit of the control unit may be configured to display a distance between stored waypoints. Preferably, the control unit is configured to provide signals to the mobile robot to delete one or more of said displayed stored waypoints. It may be a challenge to precisely navigate the mobile robot in proximity to a target location with the control unit. This process may be alleviated by introducing a slow mode, which allows the user to drive the mobile robot at a lower speed than normally. This configuration increases the time for collecting the waypoints but provides a higher precision in pointing at a target location. The slow mode may be activated and deactivated by the control unit. In some embodiments, after selecting a control function accepting manual positioning of a mobile robot, the mobile robot is configured to move at 30-90% speed compared to normal operation mode, such as within the range of 35-85%, e.g., within the range of 40-80%, such as within the range of 45-80%, e.g., within the range of 50-75%, such as within the range of 55-70%, e.g., within the range of 60-65% speed compared to normal operation mode.

If the highest possible precision is needed, the mobile robot is configured to read the position of the point and compensate for the tilting of the mobile robot due to the slope of the ground. Compensation of the tilt is possible with a clinometer (tilt angle measurement device) mounted on the mobile robot. Based on the reading of the clinometer, the correct position of the selected target point is calculated by the mobile robot. The position determining device may comprise a positioning system receiver unit configured for receiving a positioning signal. In other embodiments, the position determining device comprises a pointing element/device adapted for pointing to a location to be measured. The pointing element is preferably suspended in a suspension device adapted for vertically positioning the pointing element/device. A non-limiting example of a position determining device may be one that comprises a positioning system receiver unit configured for receiving a positioning signal; and a pointing element adapted for pointing to a location to be measured. The position determining device may comprise a pointing device adapted for pointing to a location to be measured, and where the pointing device is suspended in a suspension device adapted for vertical positioning of the pointing element/device. The pointing device may e.g. comprise a tilt angle measurement device. The tilt angle measurement device can comprise an electronic tilt measurement device. The electronic tilt measurement device can comprise a single angle measurement device or a dual angle measurement device.

Step seven (vii) includes instructing the control unit, or more general, instructing the mobile robot via the control unit to compute waypoint coordinates of the geometric figure for being marked from the fitted position of said geometric figure. It is contemplated within the scope of the invention that the mobile robot, as it comprises the control unit, is also capable of processing and/or computing waypoints. Hence, the computer processing power may be present at different locations on the robot apart from within the control unit. The mobile robot and/or the control unit may comprise a first processor, and a first memory coupled to said first processor.

The first memory may comprise program instructions configured for accepting, via said control unit, manual positioning of said mobile robot at said two or more target locations on said ground surface, as well as accepting, manual selection, via said control unit, of a geometric figure for being marked on said ground surface. The first memory also comprises program instructions configured for computing the best fit for said selected geometric figure on said surface based on said stored waypoints. How such a calculation may be performed is well-known to the killed person and will not receive detailed attention. The step of computing the best fit for the geometric figure is based on a plurality of stored waypoints, such as two, three, four, five, six, seven, eight, nine, or ten stored waypoints. The geometric figure may comprise a curved element. In this situation, the step of computing the best fit for the geometric figure based on a plurality of stored waypoints includes the step of curve fitting the curved element based on said plurality of stored waypoints. In the present context, the curve fitting operation is to be understood as the process of constructing a curve, or mathematical function, that has the best fit to a series of data points (target locations), preferably subject to pre-defined constraints. Again, how such a calculation may be performed is well-known to the killed person and will not receive further attention.

Preferably, the computed and stored waypoints of the geometric figure for being marked includes predefined reference points defining specific positions on said geometric figure, such as a center point or midline, as exemplified in FIGS. 2 and 3. Such information may be used by the mobile robot (paint marking machine) for proper positioning. The program code, when executed, may further cause one or more processors to perform the step of:

making the geographic coordinates of the geometric figure for being marked available for the mobile robot;

computing waypoint coordinates of said geometric figure for being marked from said fitted position of said geometric figure; and storing said computed waypoint coordinates of said geometric figure.

Another preferred embodiment relates to a mobile robot for use in the marking of a geometric figure on a ground surface comprising:

a paint spraying means;

a position determining device comprising a pointing device with a tip, and optionally a light emitter, and adapted for pointing to a target location to be measured on said ground surface; wherein said pointing device is mounted on said mobile robot such that said tip of said pointing device, or optionally the light emitted by said light emitter, is visible for the user of said mobile robot when said user is in an upright position;

a control unit configured for being in communication with said mobile robot;

a first processor;

a first memory coupled to said first processor, wherein said first memory comprises program instructions configured for accepting, via said control unit, manual positioning of said mobile robot at two or more target locations on said ground surface, as well as accepting, manual selection, via said control unit, of a geometric figure for being marked on said ground surface; wherein said program instructions are executable by the processor for:

storing two or more target locations as waypoints;

computing the best fit for said selected geometric figure on said surface based on said stored waypoints;

computing waypoint coordinates of said geometric figure for being marked from said fitted position of said geometric figure; and storing said computed waypoint coordinates of said geometric figure.

It should be noted that embodiments and features described in the context of one of the aspects of the present invention also apply to the other aspects of the invention.

As used in the specification and the appended claims, the singular forms "a", "an", and "the" include plural referents unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about", it will be understood that the particular value forms another embodiment.

The invention claimed is:

1. A method for interactively providing waypoints to a mobile robot for use in the marking of a geometric figure on a ground surface, said method comprising the steps of:

i) providing a geometric figure saved in a digital vector format;

ii) providing a mobile robot with a control unit comprising:

a) a database configured for storing data corresponding to a geometric figure and saved in a digital vector format, b) a database configured for storing data corresponding to a georeferenced map, and c) a display unit;

wherein said control unit is configured to:

process a georeferenced map stored in said database configured for storing data corresponding to a georeferenced map and to send a display signal for displaying said stored georeferenced map to said display unit as a first graphical layer on the display unit;

process a geometric figure saved in a digital vector format stored in said database configured for storing data corresponding to a geometric figure and saved in a digital vector format and to send a display signal for displaying said stored geometric figure to said display unit as a second graphical layer on the display unit;

wherein said display unit is configured to:

display said stored georeferenced map as a first layer in response to said display signals;

display said stored geometric figure to said display unit as a second layer in response to said display signals;

allow manipulation of the second graphical layer relative to the first layer, the manipulation comprising at least one of: translation, rotation, and scaling;

iii) storing a georeferenced map in said database configured for storing data corresponding to a georeferenced map;

iv) storing said geometric figure saved in a digital vector format in said database configured for storing data corresponding to a geometric figure and saved in a digital vector format;

v) selecting a control function on said control unit accepting manual selection of a georeferenced map in said database configured for storing data corresponding to a georeferenced map to be displayed on said display unit; said georeferenced map either being the one stored in step iii) or an already stored georeferenced map;

vi.a) selecting a control function on said control unit accepting manual selection of a geometric figure in said database configured for storing data corresponding to a geometric figure and saved in a digital vector format to be displayed on said display unit; said geometric figure either being the one stored in step iv) or an already stored geometric figure;

wherein said display unit is configured to overlay said selection of a georeferenced map in said first graphical layer and said selection of a geometric figure in said second graphical layer on said display unit, respectively;

vii) selecting a control function on said control unit instructing said control unit to compute waypoint coordinates of said geometric figure, wherein said control unit is configured to compute said waypoint by:

establishing a spatial relationship between said geometric figure and said georeferenced map;

transforming coordinate data of said geometric figure from a vector coordinate space into geographic coordinates of said georeferenced map based on said spatial relationship;

converting said geographic coordinates into a coordinate reference system used by said mobile robot; and computing said waypoint coordinates from the converted coordinates; and viii.a) instructing said mobile robot via said control unit to store said computed waypoint coordinates of said geometric figure in a database configured for storing data corresponding to a geometric figure and saved in a digital vector format; or viii.b) instructing said mobile robot via said control unit to mark said geometric figure onto said surface.

2. The method according to claim 1, wherein said control unit is configured to allow a user to move said second layer relative to said first layer, wherein said method further comprises:

vi.b) selecting a control function on said control unit accepting manual movement of said second layer relative to said first layer;

vi.c) positioning said second layer relative to said first layer in order to position said geometric figure at a specific geographical location on said georeferenced map.

3. The method according to claim 1, wherein said control unit is configured to allow a user to adjust the size of said geometric figure relative to said first layer wherein said method further comprises:

vi.b) selecting a control function on said control unit accepting resizing of said geometric figure;

vi.c) adjusting the size of said geometric figure relative to said first layer in order to secure the correct size of said geometric figure to be marked onto said surface.

4. The method according to claim 1, wherein said control unit is configured to allow a user to rotate said geometric figure relative to said first layer wherein said method further comprises:

vi.b) selecting a control function on said control unit accepting rotation of said geometric figure;

vi.c) adjusting the angle of rotation of said geometric figure relative to said first layer in order to secure the correct position of said geometric figure to be marked onto said surface.

5. The method according to claim 1, wherein said control unit is configured to allow a user to move said first layer relative to said second layer, wherein said method further comprises:

vi.b) selecting a control function on said control unit accepting manual movement of said first layer relative to said second layer;

vi.c) positioning said first layer relative to said second layer in order to position said georeferenced map or one or more waypoints relative to said geometric figure.

6. The method according to claim 1, further comprising:

selecting a control function on said control unit accepting a collection of points for a geofence with said mobile robot, said points to be displayed as a geofence on said display unit; and adjusting the position of said geometric figure to fit within said geofence by movement of said geometric figure relative to said second layer.

7. The method according to claim 1, further comprising:

selecting a control function on said control unit accepting pairing, of a point on said geometric figure with the current location of said mobile robot.

8. The method according to claim 1, wherein the control unit is configured to allow a user to pair a specific point on said geometric figure with the current location of said mobile robot or control unit.

9. The method according to claim 8, further comprising the steps of:

positioning said mobile robot at a wanted position;

selecting a specific point on said geometric figure; and selecting a control function on said control unit accepting pairing of a point on said geometric figure with the current location of said mobile robot or control unit.

10. A mobile robot for use in the marking of a geometric figure on a ground surface comprising:

a paint spraying means; and a control unit comprising:

a) a database configured for storing data corresponding to a geometric figure and saved in a digital vector format;

b) a database configured for storing data corresponding to a georeferenced map; and c) a display unit;

wherein said control unit is configured for being in communication with said mobile robot; wherein said control unit is configured to:

process a georeferenced map stored in said database configured for storing data corresponding to a georeferenced map and to send a display signal for displaying said stored georeferenced map to said display unit as a first graphical layer;

process a geometric figure saved in a digital vector format stored in said database configured for storing data corresponding to a geometric figure and saved in a digital vector format and to send a display signal for displaying said stored geometric figure to said display unit as a second graphical layer;

wherein said display unit is configured to:

display said stored georeferenced map as a first layer in response to said display signals;

display said stored geometric figure to said display unit as a second layer in response to said display signals;

allow manipulation of the second graphical layer relative to the first graphical layer, the manipulation comprising at least one of: translation, rotation, and scaling wherein said control unit further comprises:

d) a first processor; and e) a first memory coupled to said first processor, wherein said first memory comprises program instructions configured for:

selecting a control function on said control unit accepting manual selection of a georeferenced map in said database configured for storing data corresponding to a georeferenced map to be displayed on said display unit;

selecting a control function on said control unit accepting manual selection of a geometric figure in said database configured for storing data corresponding to a geometric figure and saved in a digital vector format to be displayed on said display unit;

wherein said display unit is configured to overlay said selection of a georeferenced map in said first layer and said selection of a geometric figure in said second layer on said display unit, respectively;

selecting a control function on said control unit instructing said control unit to compute waypoint coordinates of said geometric figure, wherein said program instructions are further configured to cause said processor to:

establish a spatial relationship between said geometric figure and said georeferenced map;

transform coordinate data of said geometric figure from a vector coordinate space into geographic coordinates of said georeferenced map based on said spatial relationship;

convert said geographic coordinates into a coordinate reference system used by said mobile robot; and compute said waypoint coordinates from the converted coordinates; and selecting a control function on said control unit instructing said mobile robot to store said computed waypoint coordinates of said geometric figure in a database configured for storing data corresponding to a geometric figure and saved in a digital vector format; or selecting a control function on said control unit instructing said mobile robot to mark said geometric figure onto said surface.

11. The mobile robot according to claim 10, wherein said first memory comprises program instructions configured for one or more of:

selecting a control function on said control unit accepting manual movement of said second layer relative to said first layer;

selecting a control function on said control unit accepting resizing of said geometric figure;

selecting a control function on said control unit accepting rotation of said geometric figure;

selecting a control function on said control unit accepting manual movement of said first layer relative to said second layer; and selecting a control function on said control unit accepting a collection of points for a geofence with said mobile robot, said points to be displayed as a geofence on said display unit.

12. The mobile robot according to claim 10, wherein the first memory of said mobile robot comprises program instructions configured for:

selecting a control function on said control unit accepting pairing of a point on said geometric figure with the current location of said mobile robot or control unit.

13. The mobile robot according to claim 10, wherein the control unit is configured to allow a user to pair a specific point on a geometric figure with the current location of said mobile robot or control unit.

14. The mobile robot according to claim 13, wherein the first memory of said mobile robot comprises program instructions configured for:

selecting a control function on said control unit accepting pairing of a point on said geometric figure with the current location of said mobile robot or control unit.

* * * * *